(12) United States Patent
Miyoshi et al.

(10) Patent No.: US 7,639,489 B2
(45) Date of Patent: Dec. 29, 2009

(54) PLASMA DISPLAY DEVICE

(75) Inventors: Shuhei Miyoshi, Yokohama (JP); Hideo Kimura, Tokyo (JP); Kuninori Suzuki, Chigasaki (JP)

(73) Assignee: Fujitsu Hitachi Plasma Display Limited, Miyazaki (JP)

( * ) Notice: Subject to any disclaimer, the term of this patent is extended or adjusted under 35 U.S.C. 154(b) by 415 days.

(21) Appl. No.: 11/633,074

(22) Filed: Dec. 4, 2006

(65) Prior Publication Data
US 2007/0195494 A1 Aug. 23, 2007

(30) Foreign Application Priority Data
Feb. 20, 2006 (JP) .............................. 2006-042305

(51) Int. Cl.
*H05K 7/20* (2006.01)
(52) U.S. Cl. .................. 361/679.34; 349/60; 361/757; 361/760; 313/46
(58) Field of Classification Search .................. None
See application file for complete search history.

(56) References Cited

U.S. PATENT DOCUMENTS

| | | | |
|---|---|---|---|
| 5,929,950 A * | 7/1999 | Matsuda .................. 349/60 |
| 6,583,843 B2 | 6/2003 | Ishino | |
| 6,813,159 B2 * | 11/2004 | Irie et al. .................. 361/752 |
| 6,859,357 B2 * | 2/2005 | Morimoto et al. ........ 361/679.55 |
| 6,972,963 B1 * | 12/2005 | Chou .......................... 361/760 |
| 7,321,487 B2 | 1/2008 | Kim | |
| 7,372,700 B2 * | 5/2008 | Jeong ........................ 361/704 |
| 7,379,128 B2 * | 5/2008 | Tsubokura et al. ............ 349/60 |
| 7,394,186 B2 * | 7/2008 | Kim ............................ 313/46 |
| 2006/0061945 A1 * | 3/2006 | Kim ............................ 361/681 |
| 2006/0077620 A1 * | 4/2006 | Kim ............................ 361/679 |

FOREIGN PATENT DOCUMENTS

| | | |
|---|---|---|
| CN | 1230740 | 6/1999 |
| CN | 1658256 | 8/2005 |
| JP | 2001-324942 A | 11/2001 |
| JP | 2004-6888 A | 3/2004 |
| JP | 2004-069888 A | 3/2004 |
| JP | 2004-361615 | 12/2004 |
| JP | 2005-115381 A | 4/2005 |

OTHER PUBLICATIONS

Chinese Office Action issued in Chinese Patent Application No. CN 2006101656032 dated on Apr. 25, 2008.

* cited by examiner

*Primary Examiner*—Jayprakash N Gandhi
*Assistant Examiner*—Courtney Smith
(74) *Attorney, Agent, or Firm*—McDermott Will & Emery LLP

(57) ABSTRACT

A base chassis has projection parts. A surrounding part of an image display surface of a plasma display panel (PDP) is in contact with a contact part formed around an opening part of a front case. The projection parts are fixed to a chassis fixation part of the front case. The projection parts each have an elastic structure part which elastically deforms in response to a pushing force to the display surface of the PDP. An external force from a rear case side is transmitted to the chassis fixation part only, preventing impact to the PDP. When the PDP directly receives an external force from the front case side, the elastic structure part can elastically deform to alleviate the impact to the PDP. This can alleviate stress to the PDP when applied an external force from the front surface and the rear surface of the cases.

12 Claims, 9 Drawing Sheets

PLASMA DISPLAY DEVICE

CROSS REFERENCE TO RELATED APPLICATION

This application is based upon and claims the benefit of priority from Japanese Patent Application No. 2006-042305, filed on Feb. 20, 2006, the entire contents of which are incorporated herein by reference.

BACKGROUND OF THE INVENTION

1. Field of the Invention

The present invention relates to a plasma display device in which a plasma display panel is mounted.

2. Description of the Related Art

A plasma display device is constructed by accommodating a plasma display panel module (PDP module) in a case. The PDP module is constituted of a plasma display panel (hereinafter, also referred to as PDP), a base chassis supporting the PDP, and a circuit board for driving the PDP. The PDP module is fixed to the case in a predetermined position by fixing the base chassis to installation parts in the case. A front surface of the case has an opening part at a position facing an image display surface of the PDP. The PDP is mainly made of glass, and weak to impact such as an external force. Accordingly, protection glass for protecting the PDP is attached to the opening part.

Japanese Unexamined Patent Application Publication No. 2001-324942 discloses a base chassis having a structure to disperse stress for alleviating impact applied to the PDP from a rear surface of the case. Japanese Unexamined Patent Application Publication No. 2004-069888 discloses a technique to form installation parts on a periphery of a base chassis for fixing the base chassis to the case. Japanese Unexamined Patent Application Publication No. 2005-115381 discloses a technique to fix a base chassis to a case by installation members arranged on four corners of the base chassis.

In recent years, in order to reduce the weight and cost of a plasma display device, there is proposed a plasma display device in which the protection glass on a front surface of the case is removed and the image display surface of the PDP is exposed directly via the opening part of the case. In this case, the display surface of the PDP receives impact such as an external force directly.

However, a conventional plasma display device with the display surface of the PDP protected by the protection glass does not have a structure to absorb an external force applied to the display surface. Therefore, when the PDP and the base chassis of the plasma display device without the protection glass is given stress by an external force (pushing force) applied to the display surface, the stress concentrates to a surrounding part of the PDP close to installation parts, and may cause breakage thereof.

SUMMARY OF THE INVENTION

An object of the present invention is to alleviate impact to a PDP when applied an external force from a front surface and a rear surface of a case, thereby preventing breakage of the PDP.

In a plasma display device according to the present invention, a base chassis has a chassis body in a plate form arranged on a rear surface of a plasma display panel and a plurality of projection parts provided to project from a periphery of the chassis body. A surrounding part of an image display surface of the plasma display panel is brought in contact with a contact part formed around an opening part of a front case. The projection parts of the base chassis are fixed to a chassis fixation part provided in the front case outside a periphery of the plasma display panel. A rear case is connected to the front case to cover the rear surface of the plasma display panel.

The rear case is not in contact with the plasma display panel. Accordingly, an external force applied from the rear case side is transmitted to the chassis fixation part only, preventing impact to the plasma display panel. The projection parts of the base chassis each have an elastic structure part which elastically deforms in response to a pushing force to the image display surface of the plasma display panel. Accordingly, also when the plasma display panel directly receives an external force from the front case side, the elastic structure part can elastically deform to alleviate the impact to the plasma display panel.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Hereinafter, embodiments of the present invention will be explained using drawings.

Figure 1:
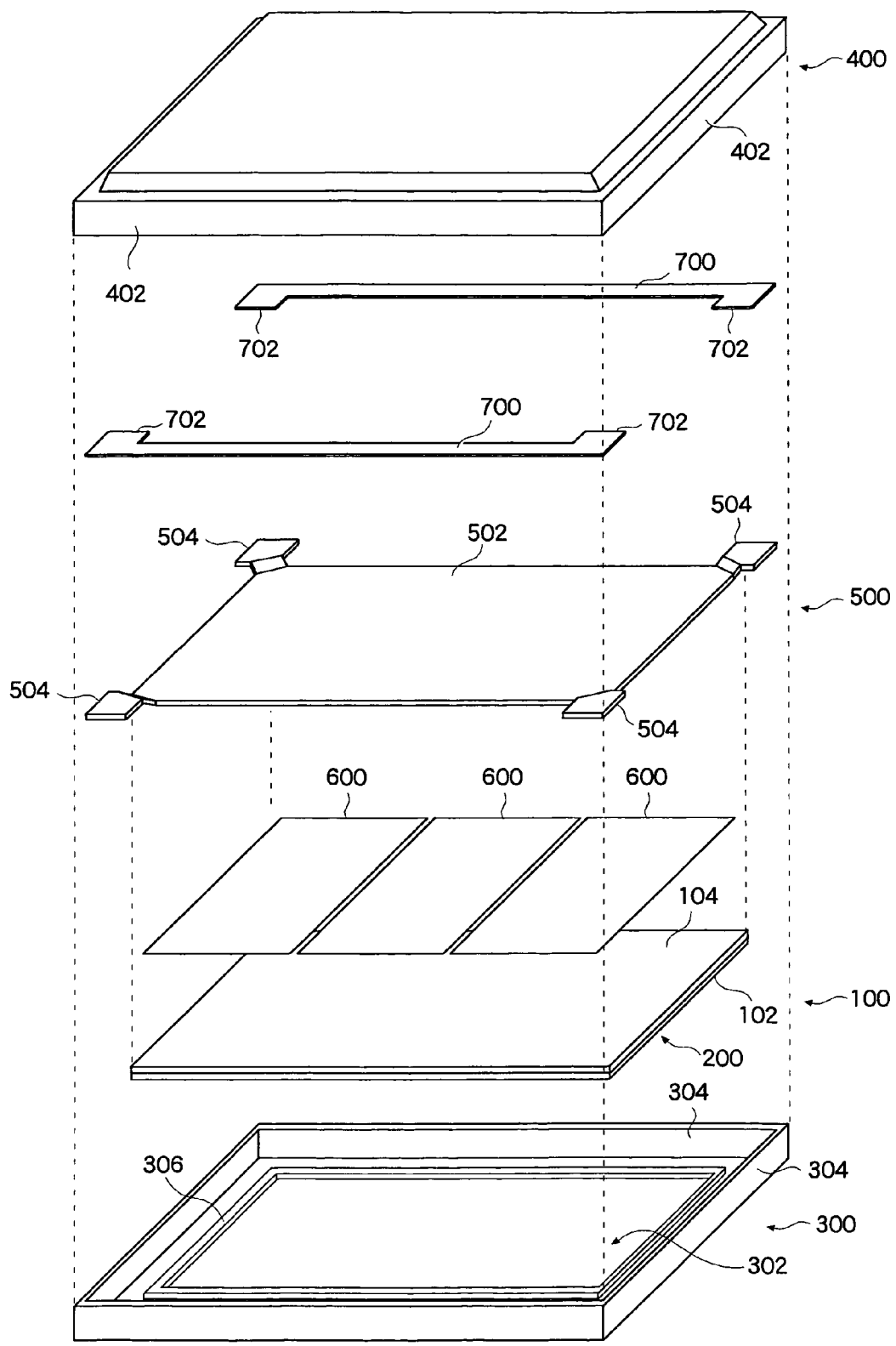
FIG. 1 is an exploded perspective view showing a first embodiment of a plasma display device according to the present invention.

FIG. 1 shows a first embodiment of the present invention. A plasma display device has a plasma display panel (PDP) 100, a filter 200 attached (arranged) on a display surface 102 side of an image of the PDP, a front case 300 arranged on the display surface 102 side of the PDP 100, a rear case 400 arranged on a rear surface 104 side of the PDP 100, a base chassis 500 arranged on the rear surface 104 side of the PDP 100, a plurality of double-faced adhesive tapes 600 which fix the PDP 100 to the base chassis 500 and a pair of reinforced plates 700 which reinforce strength of the base chassis 500. On a surface of the base chassis 400 opposing the PDP 100, a not-shown circuit board (refer to FIG. 5) for driving the PDP 100 is arranged.

A plasma display panel module (PDP module) is formed of the PDP 100, the filter 200, the base chassis 500, the double-faced adhesive tapes 600, the reinforced plates 700 and the substrate board. Specifically, the plasma display device is constituted by accommodating the PDP module in the cases 300, 400.

Figure 4:
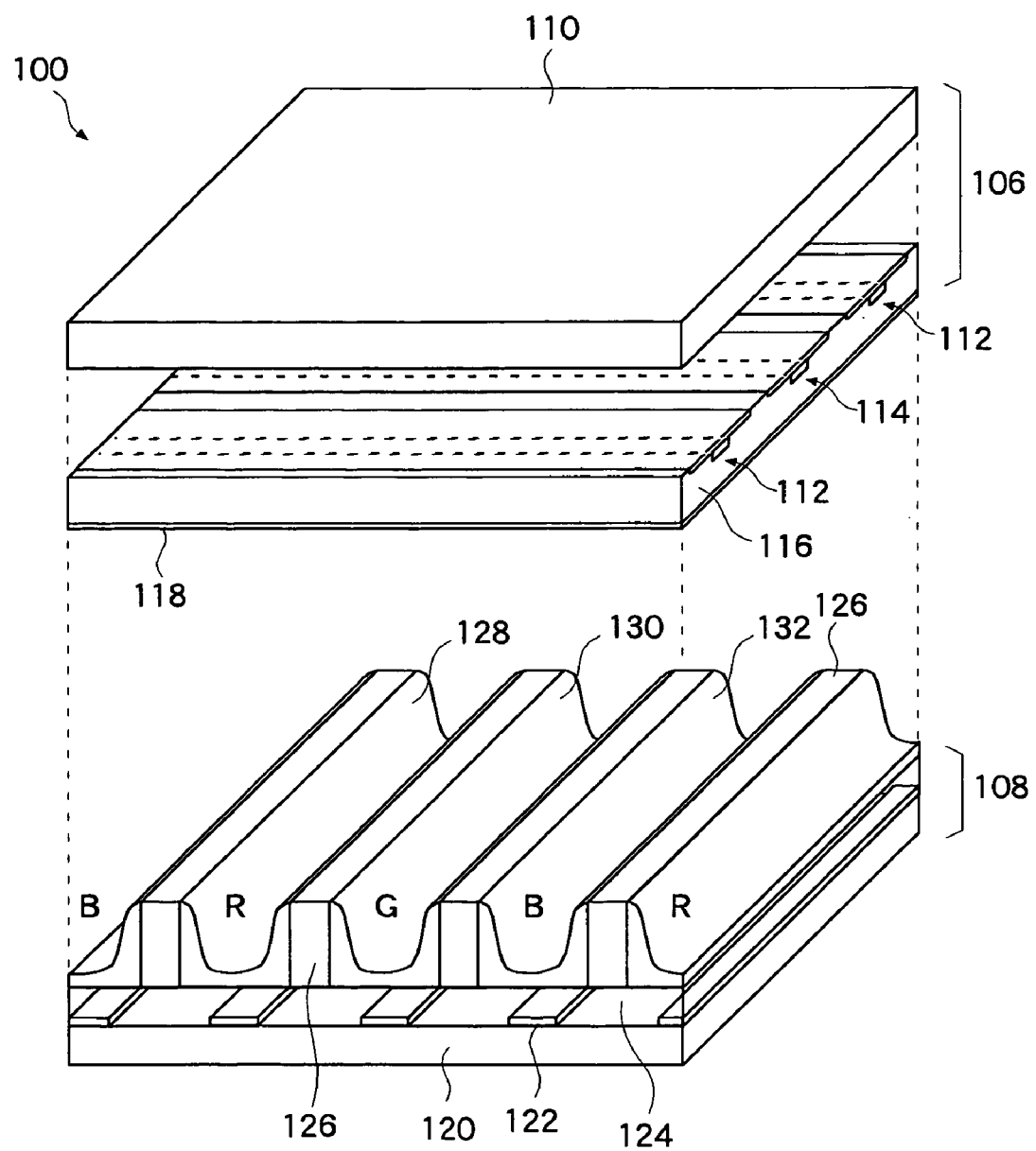
FIG. 4 is an exploded perspective view showing details of a main part of a PDP shown in FIG. 1.

As shown in FIG. 4 which is explained later, the PDP 100 is formed by, after forming electrodes 112, 114, 122 and so forth on a pair of glass substrates 110, 120 opposing each other, attaching the glass substrates 110, 120 to each other. The filter 200 is formed by, for example, attaching a metal mesh (electroconductive member) or a transparent electrode (electroconductive member) on a surface (opening part 302 side) of a polymer film (resin film). The filter 200 has transparency to light and absorbency (elasticity) for impact. Accordingly, a part of impact applied to the PDP 100 from the front case 300 is absorbed by the filter 200. Note that the filter 200 may have an optical characteristic to adjust or improve a color tone of light generated by the PDP 100. Further, the filter 200 may be constructed by attaching a film having an optical characteristic on a transparent polymer film, and attaching a electroconductive member on a surface thereof (opening part 302 side).

The front case 300 has an opening part 302 formed facing the display surface 102 of the PDP 100, and a surrounding edge part 304 projecting toward the rear case 400 side. On a periphery (edge part) of the opening part 302, a flat surface 306 in a frame form projecting on the display surface 102 side is formed. This flat surface 306 operates as a contact part to which a surrounding part of the display surface 102 contacts via the filter 200. The double-faced adhesive tapes 600 bonding the PDP 100 to the base chassis 500 are resin tapes for example and have elasticity. Accordingly, a part of impact applied to the PDP 100 from the front case 300 is absorbed by the double-faced adhesive tapes 600. For the double-faced adhesive tapes 600, ones having good heat conductivity are used. Accordingly, heat generated by the PDP 100 can be transmitted efficiently to the base chassis 500 and the reinforced plates 700. The rear case 400 has a surrounding edge part 402 projecting toward the front case 300 side. The rear case 400 covers the rear surface side of the PDP module, and the surrounding edge part 402 is connected to the surrounding edge part 304 of the front case 300.

The base chassis 500 has a substantially square shape, and has a chassis body 502 in a plate form facing the PDP 100, and projection parts 504 projecting respectively from four corners of the chassis body 502 outward (in a flat surface direction of the base chassis 500). The chassis body 502 and the projection parts 504 are formed of one member by, for example, pressing a plate material made of an aluminum alloy. Details of the projection parts 504 are explained with FIG. 2 and FIG. 3. The reinforced plates 700 are formed of, for example, plate materials made of an aluminum alloy. The reinforced plates 700 have a slender shape along a longer side direction of the PDP 100, and each have installation surfaces 702 corresponding to shapes of the projection parts 504. By forming the base chassis 500 and the reinforced plates 700 of an aluminum alloy, heat generated from the PDP 100 and electronic parts on the circuit board can be diffused efficiently to the outside, and at the same time the weight can be reduced.

Figure 2:
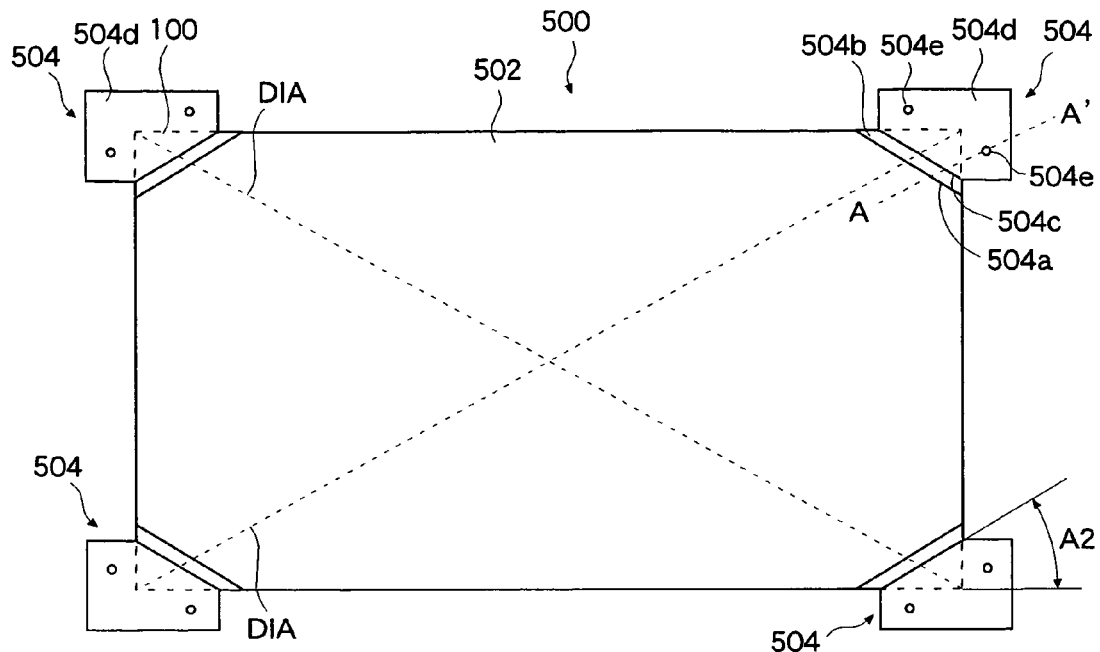
FIG. 2 is a plan view showing details of a base chassis shown in FIG. 1.
Figure 3:
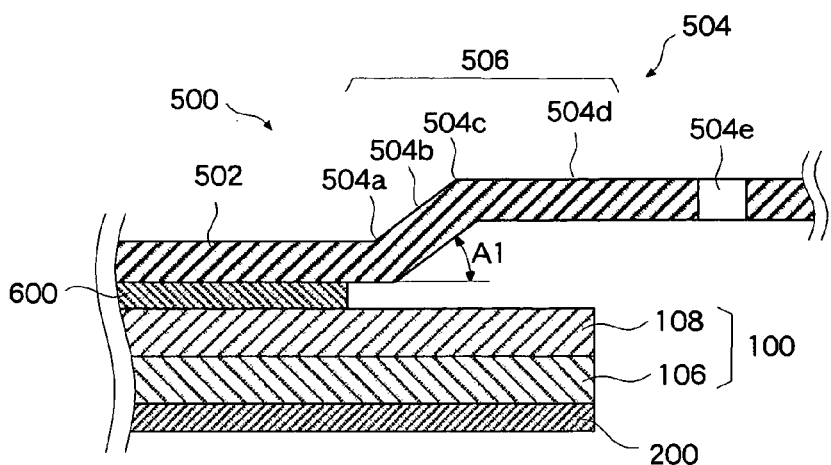
FIG. 3 is a cross-sectional view showing details of a main part of the base chassis shown in FIG. 2.

FIG. 2 and FIG. 3 show details of the base chassis 500 shown in FIG. 1. FIG. 3 shows a cross-section taken along an A-A' line in FIG. 2. The projection parts 504 of the base chassis 500 are formed by bending the four corners of the chassis body 502 in a step form toward the rear case 400 side shown in FIG. 1. By bending in a step form, as shown in FIG. 3, a first bend part 504a, a first extension part 504b, a second bend part 504c and a second extension part 504d are formed. The bend parts 504a, 504c are in a linear shape and the extension parts 504b, 504d are in a flat shape, and shapes of the projection parts 504 are simple. Accordingly, the projection parts 504 can be formed easily by bending a plate material by pressing or the like. Therefore, the manufacturing cost of the base chassis 500 can be almost equal to that of conventional ones.

The first bend part 504a is formed by bending a projection part 504 from the chassis body 502 toward the surrounding edge part 402 side of the rear case 400. The first extension part 504b is connected to the first bend part 504a and extends obliquely in a direction to depart from a center of the PDP 100 toward the rear case 400 side. The second bend part 504c is formed by bending an edge side of the first extension part 504b toward the PDP 100 side. The second extension part 504d is connected to the second bend part 504c and extends in a direction parallel to the display surface 102 of the PDP 100. The second extension part 504d has penetration holes 504e for allowing penetration of screws to fix the base chassis 500 to the front case 300.

A bend angle A1 of the extension part 504b relative to a flat surface of the PDP 100 is preferably 30 degrees or larger and smaller than 90 degrees. Accordingly, the projection part 504 can have a spring characteristic against a force applied in an orthogonal direction of the PDP 100. In other words, the first bend part 504a, the first extension part 504b and the second bend part 504c function as an elastic structure part 506 which elastically deforms in response to a pressing force applied to the display surface 102 of the PDP 100.

As shown in FIG. 2, bend lines of the bend parts 504a, 504c are formed substantially in parallel to a diagonal line DIA of the PDP 100 corresponding to a pair of projection parts 504 located next to the projection part 504 of these bend parts 504a, 504c. Specifically, the bend lines of the bend parts 504a, 504c are formed along an extending direction of the diagonal line DIA. An angle A2 for the bend lines in this embodiment is about 29 degrees given that a ratio of the longer side and the shorter side of the PDP is 16:9. The angle A2 for the bend lines are preferably 25 degrees or larger and 40 degrees or smaller. Accordingly, the length of the longer side of the chassis body 502 corresponding to the longer side of the PDP 100 can be made relatively short, so that, in particular, it is possible to enhance rigidity against bending of the base chassis 500 with a shorter side direction thereof being an axis. Note that when the bend lines are formed substantially in parallel to the diagonal line DIA (the angle A2=29 degrees), it is possible to enhance the rigidity against bending with the shorter side direction being an axis without impairing rigidity against bending of the base chassis 500 with a longer side direction thereof being an axis.

FIG. 4 shows details of a main part of the PDP 100 shown in FIG. 1. The PDP 100 is formed by attaching a front substrate 106 and a rear substrate 108, which are composed of glass, to each other. The front substrate 106 has X electrodes 112, Y electrodes 114 for discharging repeatedly, which are formed alternately on the glass substrate 110 in parallel to each other. The electrodes 112, 114 are covered by a dielectric layer 116, and further, a surface of the dielectric layer 116 is covered by a protection layer 118 of MgO or the like.

The rear substrate 108 has address electrodes 122 formed in parallel to each other on the glass substrate 120. The address electrodes 122 are arranged in a direction perpendicular to the X electrodes 112, Y electrodes 114. The address electrodes 122 are covered by a dielectric layer 124. On the dielectric layer 124, barrier ribs 126 are formed at positions corresponding respectively to both sides of the address electrodes 122. The barrier ribs 126 partitions discharge cells in a row direction. Furthermore, on side faces of the barrier ribs 126 and on the dielectric layer 124 between the barrier ribs 126, there are applied phosphors 128, 130, 132 which emit visible lights of red (R), green (G), blue (B) when being activated by an ultraviolet ray.

The PDP 100 is constructed by attaching the front substrate 106 and the rear substrate 108 so that the protection layer 118 and the barrier ribs 126 come in contact with each other, and sealing discharge gas such as Ne, Xe, or the like. The respective electrodes 112, 114, 122 extend to ends of the PDP 100 located outside a seal area formed on an outer peripheral part of the PDP 100, and are connected to a driver circuit via a later-described flexible printed circuit or the like.

Figure 5:
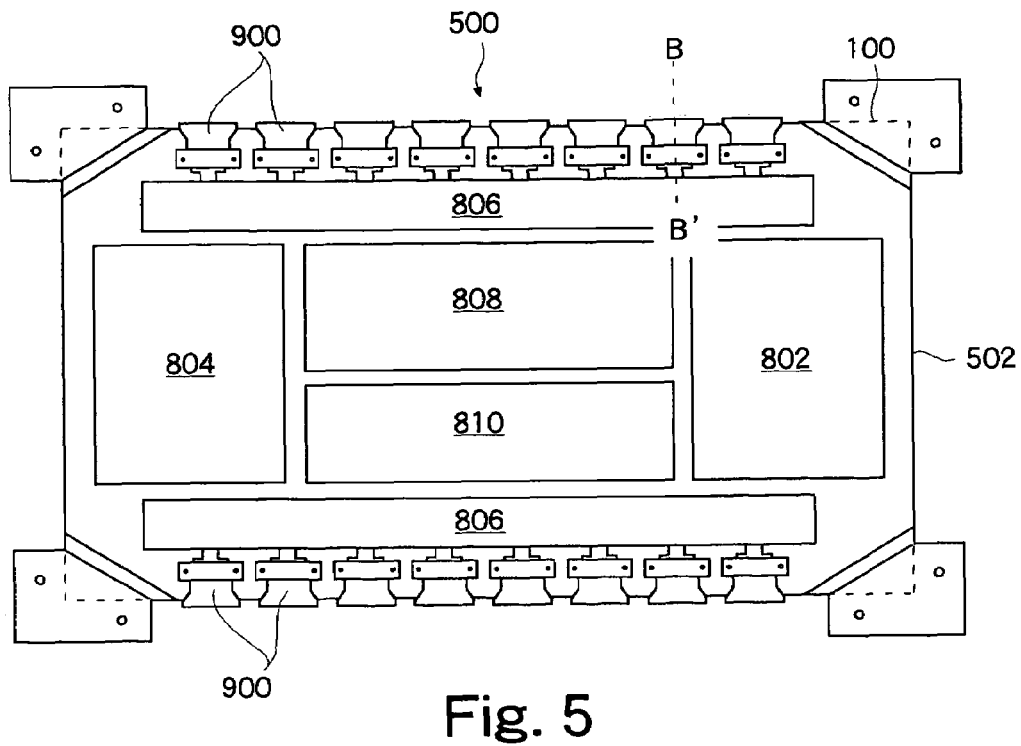
FIG. 5 is a plan view showing electronic parts (circuit board) mounted on the base chassis.

FIG. 5 shows electronic parts (circuit board) mounted on a surface of the base chassis 500 on the rear surface side (rear case 400 side). On the chassis body 502, an X driver circuit 802, a Y driver circuit 804, address driver circuits 806, a power-supply circuit 808, a control circuit 810 and driver modules 900 are mounted. The X driver circuit 802 applies voltage to the X electrodes 112 shown in FIG. 4. The Y driver circuit 804 applies voltage to the Y electrodes 114. The address driver circuits 806 drive the driver modules 900 for applying voltage to the address electrodes 122. On each of the driver modules 900, an address driver is mounted to apply voltage to the address electrodes 122. The power-supply circuit 808 supplies power to the driver circuits 802, 804, 806. The control circuit 810 controls operations of the above circuit.

Eight driver modules 900 are arranged along each longer side of the base chassis 500. The driver modules 900 are fixed to the base chassis 500 using studs (bosses) having female screws. Details of the driver modules 900 are explained in later-described FIG. 6. The address driver circuits 806 are arranged respectively along each longer side of the base chassis 500. Note that the address driver circuit 806 and the driver modules 900 may be arranged along only one longer side of the base chassis 500.

Figure 6:
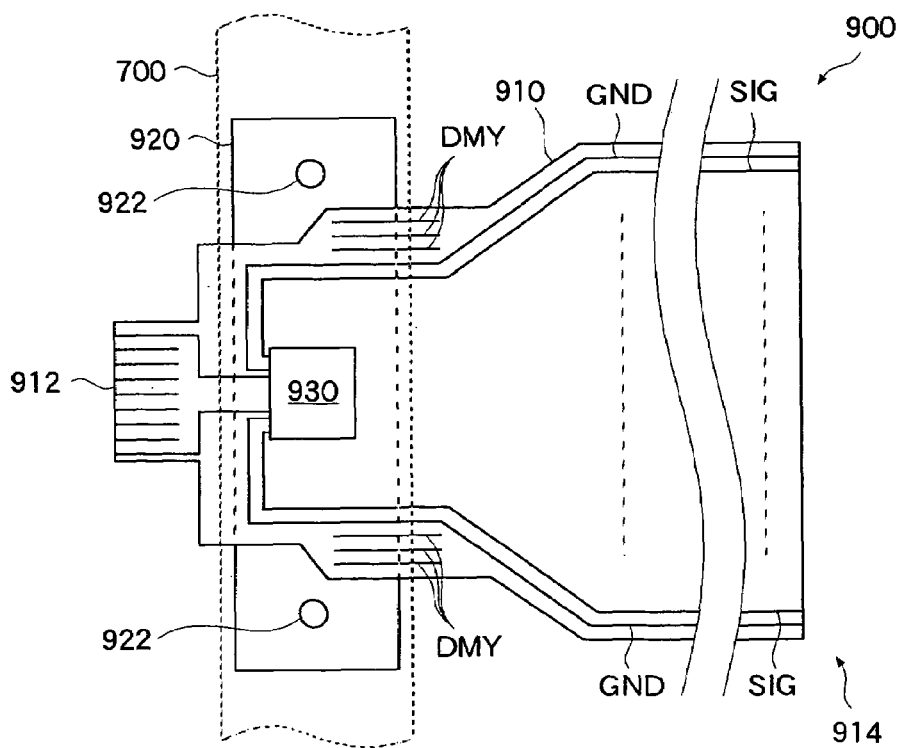
FIG. 6 is a plan view showing a state that a reinforced plate is mounted on the base chassis.

FIG. 6 shows details of the driver modules 900 shown in FIG. 5. The driver modules 900 each have a radiation plate 920 attached on a flexible printed circuit 910, and a driver IC 930 mounted on the flexible printed circuit 910. The radiation plate 920 is formed of, for example, an aluminum alloy for enhancing a radiation characteristic, and has penetration holes (installation holes) 922 for installing the driver module 900 to the base chassis 500 and the reinforced plates 700.

The flexible printed circuit 910 has a connection part 912 connected to the address driver circuit 806 and a connection part 914 connected to the address electrodes 122 of the PDP 100. On both sides of the connection part 914 of the flexible printed circuit 910, ground lines GND are arranged, and on an area sandwiched between the ground lines GND, signal lines SIG connected to the address electrodes 122 are arranged. On the flexible printed circuit 910, a plurality of dummy lines DMY are arranged on a surface opposing the radiation plate 920. Heat generated by the driver IC is transmitted efficiently by the dummy lines DMY to the radiation plate 920.

Figure 7:
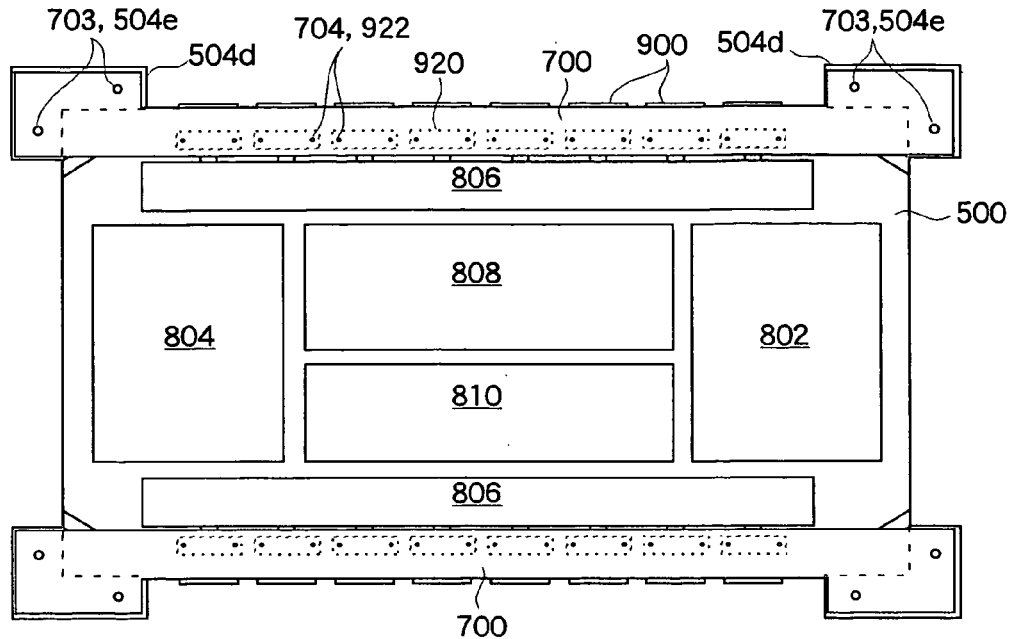
FIG. 7 is a plan view showing details of a driver module shown in FIG. 5.

FIG. 7 shows a state that the reinforced plates 700 are mounted on the base chassis 500. The reinforced plates 700 each have penetration holes 703, 704. The penetration holes 703 are formed at positions corresponding to the penetration holes 504e formed in the second extension part 504d (FIG. 2) of the base chassis 500. The penetration holes 704 are formed at positions corresponding to the penetration holes 922 of the driver module 900.

The driver module 900 is attached to the base chassis 500 together with the reinforced plate 700 by inserting screws in the penetration holes 703, 922 and attaching these screws to bosses fixed on the base chassis 500. The radiation plate 920 of the driver module 900 is in close contact with the reinforced plate 700 in a pressed state by screwing. Accordingly, heat generated from the driver module 900 is transmitted efficiently to the reinforced plate 700 and dispersed from the reinforced plate 700.

The reinforced plates 700 are attached to the front case 300 together with the base chassis 500 by inserting screws in the penetration holes 703, 504e and attaching these screws to the front case 300. The reinforced plates 700 are in close contact with the second extension parts 504d of the base chassis 500 in a pushed state. Accordingly, a part of heat generated from the PDP 100 and conducted to the base chassis 500 is conducted further to the reinforced plates 700. In other words, the reinforced plates 700 can lower a surface temperature of the PDP 100.

Furthermore, the reinforced plates 700 can enhance rigidity of the base chassis 500. Especially, the reinforced plates 700 are arranged along a longer side of the base chassis 500, and are fixed to the base chassis 500 via not only the second extension parts 504d but also the radiation plates 920 of the driver modules 900. This can enhance rigidity against bending of the base chassis 500 with a shorter side direction thereof being an axis.

Figure 8:
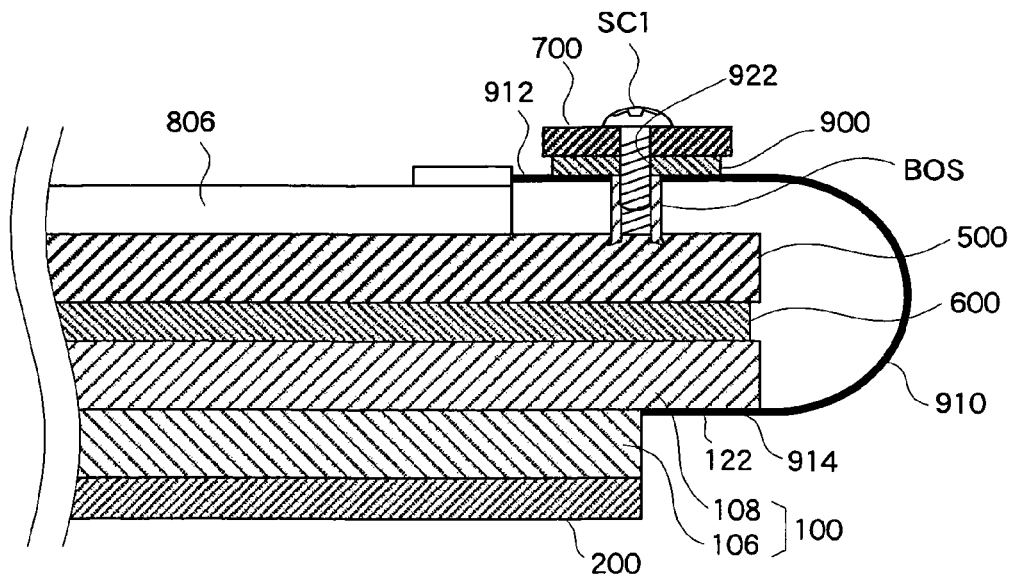
FIG. 8 is a cross-sectional view showing a main part of a PDP module in the first embodiment.

FIG. 8 shows a cross-section of a main part of the PDP module. FIG. 8 shows a cross section taken along a B-B' line in FIG. 5. As described above, the driver modules 900 are fixed to the base chassis 500 together with the reinforced plate 700 by attaching the screws SC1 inserted in the penetration holes 922 to female screw parts of the bosses BOS. The flexible printed circuits 910 of the driver modules 900 are curved, and the connection parts 914 of the flexible printed circuits 910 are connected to the address electrodes 122 formed on the rear substrate 108 of the PDP 100.

Figure 9:
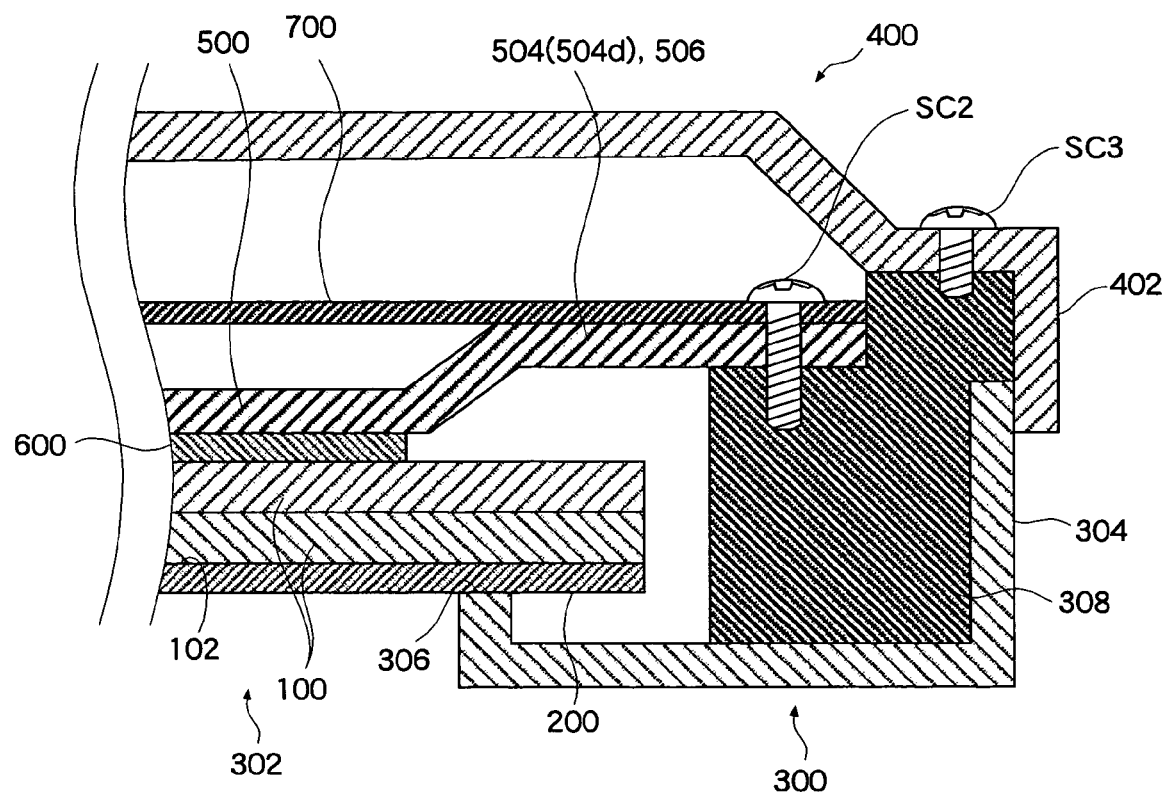
FIG. 9 is a cross-sectional view showing a main part of the plasma display device in the first embodiment.

FIG. 9 shows a cross-section of a main part of the plasma display device shown in FIG. 1. FIG. 9 corresponds to the cross-section taken along the A-A' line in FIG. 2. Inside the surrounding edge part 304 of the front case 300, a chassis fixation part 308 in an annular form is formed. The chassis fixation part 308 is arranged outside a periphery of the PDP 100 at a position not in contact with the PDP 100. The chassis fixation part 308 is, for example, formed of resin having electric nonconductivity.

The PDP module (100, 200, 500, 600, 700) is installed on the front case 300 by fixing the projection parts 504 (second extension parts 504d) of the base chassis 500 and the reinforced plates 700 by screws SC2 to the chassis fixation part 308. In a state that the PDP module is installed on the front case 300, the display surface 102 of the PDP 100 abuts on the flat surface 306 in a frame form of the front case 300 via the filter 200. The rear case 400 is fixed by screws SC3 to the chassis fixation part 308 after the surrounding edge part 402 is placed outside the surrounding edge part 304 of the front case 300. Thus, the plasma display device is constructed. Note that the rear case 400 has penetration holes for allowing penetration of the screws SC3.

In this embodiment, the front case 300 and the rear case 400 are formed including resin or metal having electroconductivity. The filter 200 has a metal mesh or a transparent electrode attached on a surface thereof. Thus, in a state shown in FIG. 9, the PDP module is shielded electrically from the outside by the front case 300, the rear case 400 and the filter 200. As a result, it is possible to prevent leakage of electromagnetic radiations generated from the PDP 100 and the driver circuits 802, 804, 806.

The base chassis 500 is not connected to the rear case 400. Accordingly, when impact (external force) is applied from the rear case 400 side toward the PDP 100, the impact is not transmitted to the PDP 100 but is absorbed by the chassis fixation part 308. Even when the impact is transmitted from the chassis fixation part 308 to the base chassis 500, the elastic structure parts 506 of the projection parts 504 elastically deform, so that transmission of the impact to the PDP 100 can be prevented.

On the other hand, when impact is applied from the front case 300 side toward the PDP 100, the PDP 100 receives the impact directly. However, the elastic structure part 506 elastically deforms by a pushing force received by the PDP 100, so that stress applied to the surrounding part of the PDP 100 by the impact can be alleviated. In other words, the impact applied to the PDP 100 is absorbed by the elastic structure parts 506. Thus, in the plasma display device having a structure such that the display surface of an image of the PDP 100 is exposed via the opening part 302 of the front case 300, impact resistance of the PDP 100 can be enhanced.

As above, in the first embodiment, since the projection parts 504 has the elastic structure parts 506, even when impact (external force) is applied to the PDP 100 from the display surface 102 side of an image, the stress applied to the PDP 100 can be alleviated due to elastic deformation of the elastic structure parts 506. Accordingly, particularly in a plasma display device which does not have a protection glass on the display surface 102 side, impact resistance from the front side can be enhanced, and thus breakage of the PDP 100 can be prevented.

Figure 10:
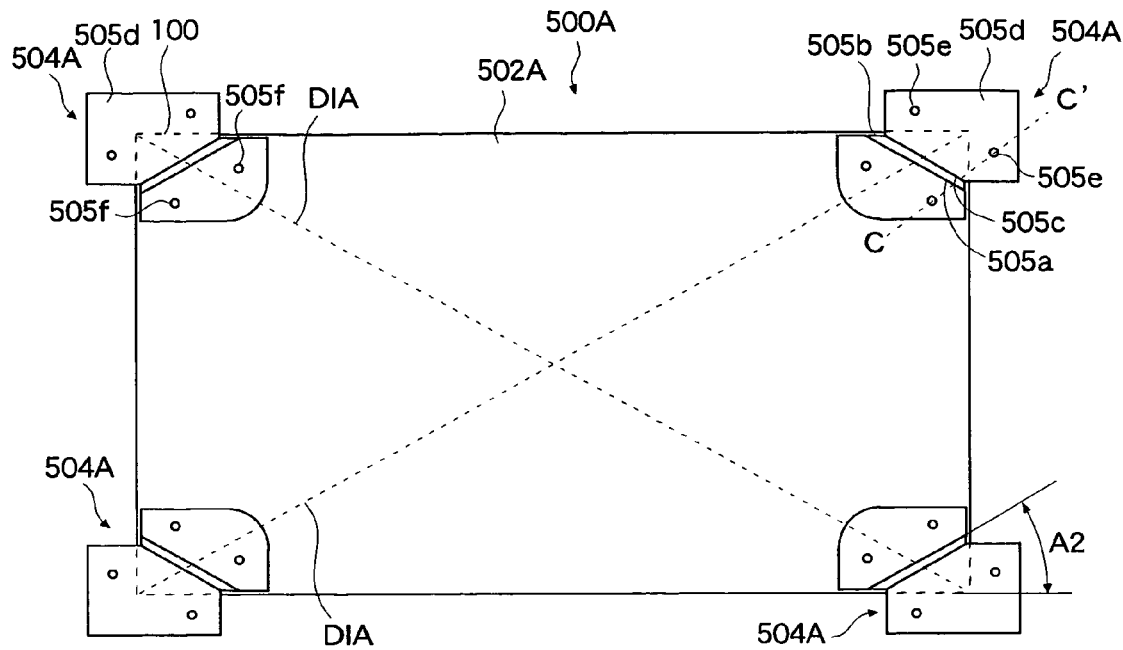
FIG. 10 is a plan view showing details of a base chassis in a second embodiment of a plasma display device according to the present invention.

FIG. 10 shows a base chassis 500A in a second embodiment of a plasma display device according to the present invention. The same elements as those explained in the first embodiment are designated the same symbols, and detailed descriptions of them are omitted. The base chassis 500A is formed of a chassis body 502A in a rectangular plate form having a shape corresponding to that of the PDP 100, and projection members (projection parts) 504A attached to four corners of the chassis body 502A respectively. The chassis body 502A and the projection members 504A are each formed of an aluminum alloy for enhancing a radiation characteristic and reducing a weight thereof. The structure excluding the base chassis 500A is the same as in the first embodiment.

The projection members 504A are formed by bending a plate material in a step form. Then, similarly to the projection part 504 in the first embodiment, the projection members 504A are each formed to have a first bend part 505a, a first extension part 505b, a second bend part 505c and a second extension part 505d. The first bend part 505a, the first extension part 505b, the second bend part 505c and the second extension part 505d have the same shapes as the first bend part 504a, the first extension part 504b, the second bend part 504c and the second extension part 504d in the first embodiment. The second extension part 505d has penetration holes 505e for allowing penetration of screws for fixing the base chassis 500A to the front case 300. The projection member 504A has penetration holes 505f for allowing penetration of screws for attaching the projection member 504A to the chassis body 502A.

Similarly to the first embodiment, bend lines of the bend parts 505a, 505c are formed substantially in parallel to a diagonal line DIA of the PDP 100 corresponding to a pair of adjacent projection members 504A. An angle A2 for the bend lines is 29 degrees in this example, and is preferably 25 degrees or larger and smaller than 90 degrees, due to the same reasons as in the first embodiment.

Figure 11:
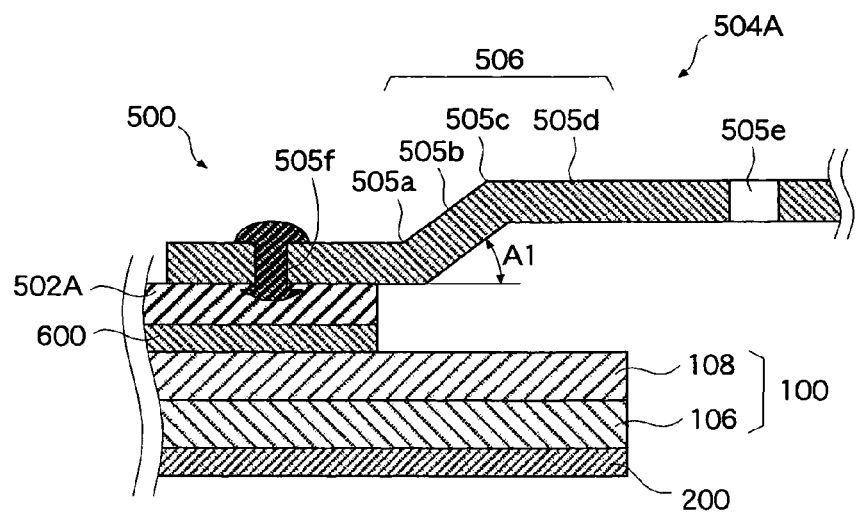
FIG. 11 is a cross-sectional view showing details of a main part of the base chassis shown in FIG. 10.

FIG. 11 shows details of a main part of the base chassis 500A shown in FIG. 10. FIG. 11 shows a cross-section taken along a C-C' line in FIG. 10. The projection member 504A is fixed to the chassis body 502A by embedding caulking members in penetration holes 505f. A bend angle A1 for the first extension part 505b relative to the flat surface of the PDP 100 is, similarly to the first embodiment, preferably 30 degrees or larger and smaller than 90 degrees. Accordingly, the first bend part 505a, the first extension part 505b and the second bend part 505c function as an elastic structure part 506 which elastically deforms in response to a pressing force applied to the display surface 102 of the PDP 100.

Figure 12:
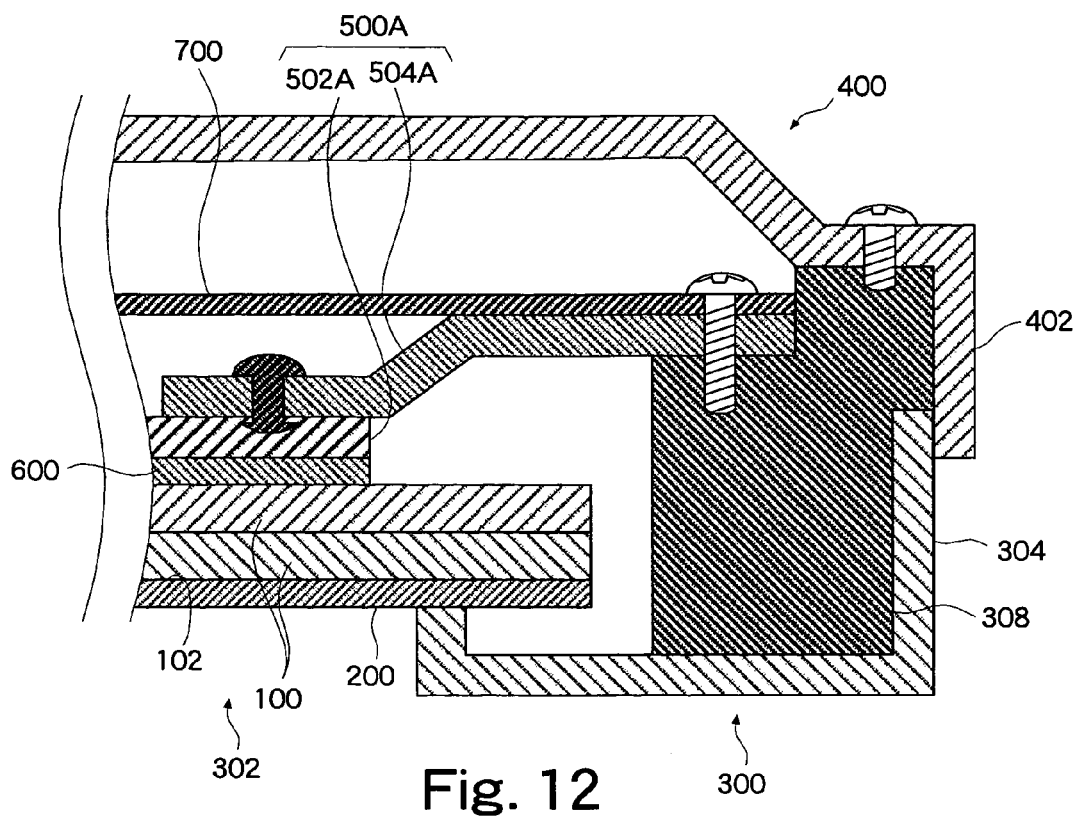
FIG. 12 is a cross-sectional view showing a main part of the plasma display device in the second embodiment.

FIG. 12 shows a cross-section of a main part of the plasma display device shown in FIG. 10. FIG. 12 corresponds to the cross-section taken along the C-C' line in FIG. 10. The plasma display device of this embodiment is identical to the plasma display device of the first embodiment except the structure of the base chassis 500A.

As above, also in the second embodiment, the same effects as in the first embodiment can be obtained. Furthermore, in this embodiment, by forming the base chassis 500A of the chassis body 502A and the projection members 504A, the base chassis 500A can be manufactured easily. Further, when a projection member 504A has a defect, it is just needed to replace the projection member 504A, which simplifies fixing.

Note that in the above-described embodiments, examples of forming the base chassis 500, 500A, the reinforced plates 700 and the radiation plates 920 of an aluminum alloy are explained. The present invention is not limited to such embodiments. For example, the base chassis 500, 500A, the reinforced plates 700 and the radiation plates 920 may be formed of an iron alloy. In this case, the cost of the plasma display device can be reduced.

Figure 13:
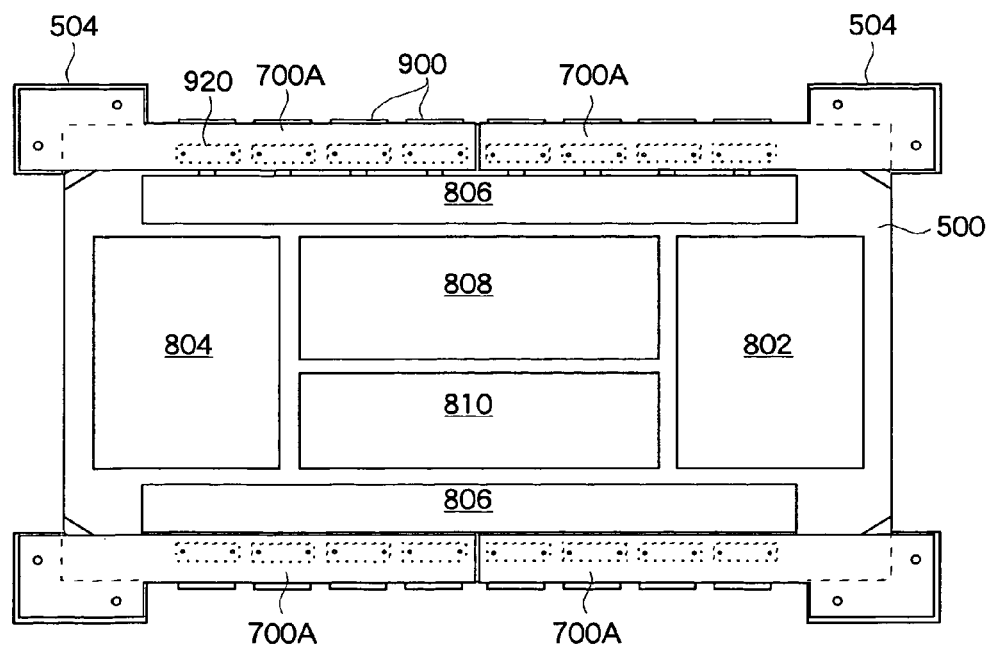
FIG. 13 is a plan view showing another example of reinforced plates.

In the above-described embodiments, an example of forming one reinforced plate 700 along a longer side direction of the PDP 100 is explained. The present invention is not limited to such embodiments. For example, as shown in FIG. 13, two reinforced plates 700A may be used. In this example, each reinforced plate 700A fixes a projection part 504 of the base chassis 500 and four radiation plates 920 aligned in a longer side direction from this projection part 504 to the PDP 100 with each other. The radiation plates 920 are fixed to the base chassis 500 together with the reinforced plate 700A. Accordingly, the original purpose for enhancing the rigidity of the base chassis 500 by the reinforced plate 700A is not impaired. Further, each reinforced plate can be detached individually from a substantially center part of a longer side of the base chassis 500, which simplifies fixing.

Figure 14:
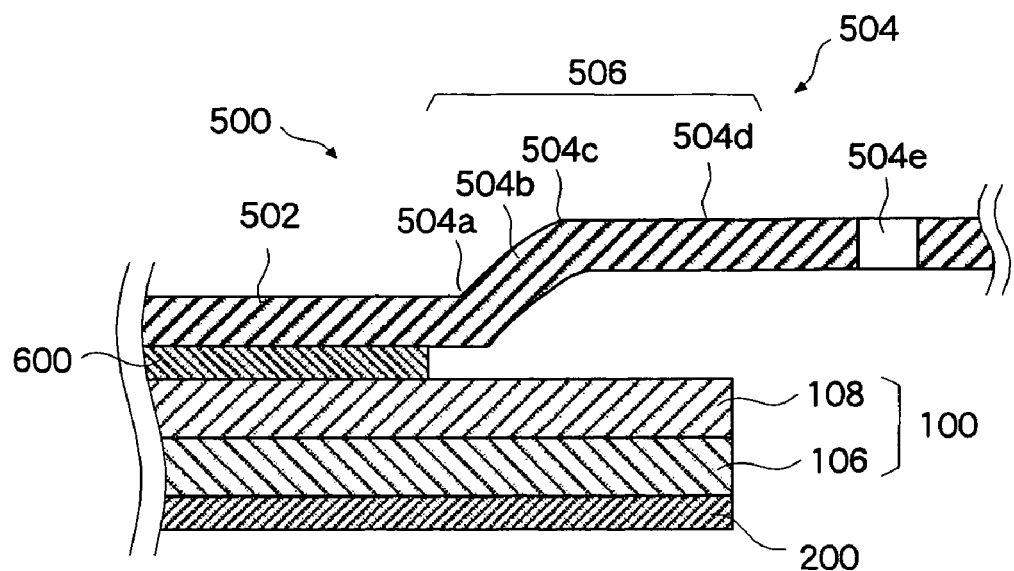
FIG. 14 is a cross-sectional view showing another example of a base chassis.
Figure 15:
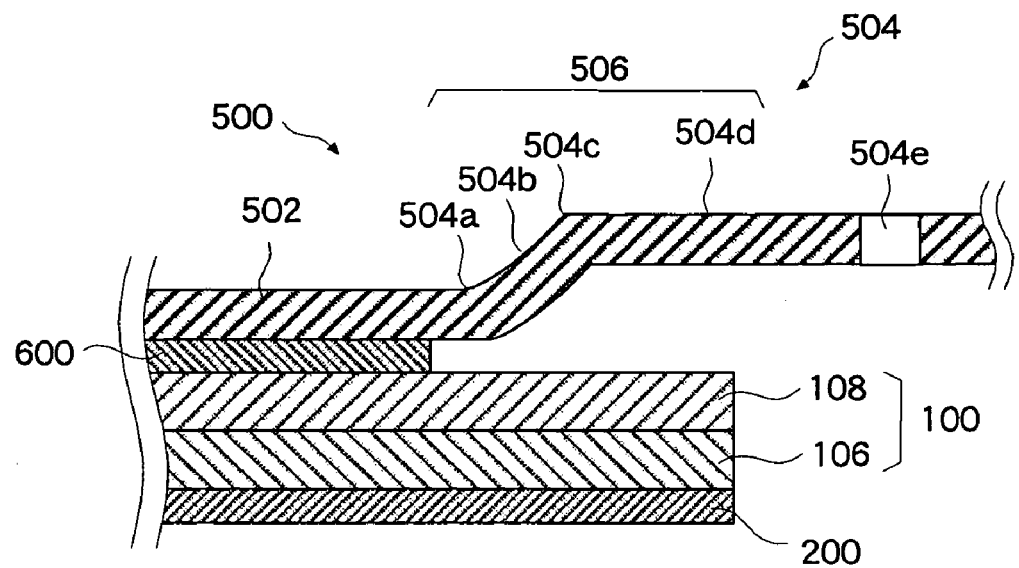
FIG. 15 is a cross-sectional view showing another example of a base chassis.

In the above-described embodiments, there are explained examples of forming the bend part 504a, the extension part 504b and the bend part 504c by bending the projection part 504 of the base chassis 500 twice in a step form, to thereby constitute the elastic structure 506 by these bend part 504a, extension part 504b and bend part 504c. The present invention is not limited to such embodiments. For example, as shown in FIG. 14 and FIG. 15, the elastic structure part 506 may be formed by curving one of the bend parts 504a and 504c. Alternatively, both the bend parts 504a, 504c may be in a curved shape. In this case, an elastic deformation amount of the projection part 504 in response to a pushing force applied to the display surface 102 of the PDP 100 can be increased. In other words, the elastic structure part 506 having more flexibility can be formed.

In the above-described embodiments, there are explained examples of arranging the reinforced plates 700, 700A along a longer side of the PDP 100. The present invention is not limited to such embodiments. For example, the reinforced plates may be arranged along a shorter side of the PDP 100 or along a longer side and a shorter side of the PDP 100 respectively. Furthermore, the reinforced plates may be arranged along a diagonal line DIA of the PDP 100.

The invention is not limited to the above embodiments and various modifications may be made without departing from the spirit and scope of the invention. Any improvement may be made in part or all of the components.

What is claimed is:

1. A plasma display device, comprising:
    a plasma display panel;
    a base chassis having a chassis body in a plate form attached on a rear surface of said plasma display panel and a plurality of projection parts provided to project from a periphery of said chassis body;
    a front case having formed therein an opening part facing an image display surface of said plasma display panel, a contact part formed in a periphery of said opening part and brought in contact with a surrounding part of said display surface, a chassis fixation part provided outside a periphery of said plasma display panel to fix said projection parts of said base chassis; and
    a rear case connected to said front case to cover the rear surface of said plasma display panel, wherein:
    said projection parts of said base chassis each comprise an elastic structure part which elastically deforms in response to a pushing force to said display surface of said plasma display panel;
    said projection parts each comprise a first bend part which is bent from said chassis body toward said rear case, a first extension part which is connected to said first bend part and extends in such a direction to depart from a center of said plasma display panel toward said rear case, a second bend part which is connected to an end of said first extension part and bent toward a center of said plasma display panel, and a second extension part which is connected to said second bend part and extends in a direction parallel to said display surface of said plasma display panel;
    said elastic structure part comprises said first bend part, said first extension part and said second bend part;
    said projection parts are provided in correspondence with four corner parts of said plasma display panel, respectively; and
    bend lines of said first and second bend parts are formed in an extension direction of a diagonal line connecting two corner parts adjacent to a corresponding corner part.

2. The plasma display device according to claim 1, further comprising
    an electroconductive member arranged on said display surface of said plasma display panel, wherein
    said contact part is brought in contact with said display part via said electroconductive member;
    said chassis fixation part has electric nonconductivity; and
    said front case and said rear case have electroconductivity.

3. The plasma display device according to claim 1, further comprising
    a reinforced plate fixing at least two of said projection parts to each other.

4. The plasma display device according to claim 3, further comprising
    a plurality of electronic parts which are attached on a surface of said base chassis along a surrounding part of said base chassis and have a radiation plate, the surface being on a side opposite to a plasma display panel side, wherein
    said reinforced plate is made of metal, and it is fixed to said radiation plate while fixed to said projection parts.

5. The plasma display device according to claim 4, wherein said reinforced plate is made of an aluminum alloy.

6. The plasma display device according to claim 4, wherein said reinforced plate is made of an iron alloy.

7. The plasma display device according to claim 3, wherein said reinforced plate is arranged in a direction of a long side of said plasma display panel and connects projection parts with each other, the projection parts being aligned in the direction of the long side thereof.

8. The plasma display device according to claim 1, further comprising:
    a plurality of electronic parts which are attached on a surface of said base chassis along a surrounding part of said base chassis and have radiation plates, respectively, the surface being on a side opposite to a plasma display panel side; and
    a plurality of reinforced plates made of metal, fixing said projection parts and a predetermined number of radiation plates to each other, respectively, the radiation plates being aligned in one direction from said projection parts.

9. The plasma display device according to claim 1, wherein said chassis main body and said projection parts are formed of one member.

10. The plasma display device according to claim 1, wherein
    said projection parts are formed of members different from that of said chassis body.

11. The plasma display device according to claim 10, wherein
    said different members constituting said projection parts are made of an aluminum alloy.

12. The plasma display device according to claim 10, wherein
    said different members constituting said projection parts are made of an iron alloy.

* * * * *

UNITED STATES PATENT AND TRADEMARK OFFICE
CERTIFICATE OF CORRECTION

PATENT NO. : 7,639,489 B2  Page 1 of 1
APPLICATION NO. : 11/633074
DATED : December 29, 2009
INVENTOR(S) : Miyoshi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 440 days.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,639,489 B2  Page 1 of 1
APPLICATION NO. : 11/633074
DATED : December 29, 2009
INVENTOR(S) : Shuhei Miyoshi et al.

It is certified that error appears in the above-identified patent and that said Letters Patent is hereby corrected as shown below:

On the title page:

In Item "(56) References Cited", under "FOREIGN PATENT DOCUMENTS",
please delete the reference "JP 2004-6888 A 03/2004".

Signed and Sealed this

Twenty-third Day of November, 2010

David J. Kappos
*Director of the United States Patent and Trademark Office*